(12) United States Patent
Salyers

(10) Patent No.: US 9,998,554 B2
(45) Date of Patent: *Jun. 12, 2018

(54) CUSTOMIZED GRAPHIC IDENTIFIERS

(71) Applicant: IMDB.com, Inc., Seattle, WA (US)

(72) Inventor: Tanya Salyers, Seattle, WA (US)

(73) Assignee: IMDB.COM, INC., Seattle, WA (US)

( * ) Notice: Subject to any disclaimer, the term of this patent is extended or adjusted under 35 U.S.C. 154(b) by 773 days.

This patent is subject to a terminal disclaimer.

(21) Appl. No.: 14/491,066

(22) Filed: Sep. 19, 2014

(65) Prior Publication Data

US 2015/0007045 A1 Jan. 1, 2015

Related U.S. Application Data

(63) Continuation of application No. 13/608,845, filed on Sep. 10, 2012, now Pat. No. 8,843,839.

(51) Int. Cl.
*G06Q 10/10* (2012.01)
*H04L 29/08* (2006.01)
*G06Q 50/00* (2012.01)
*G06F 3/0481* (2013.01)
*H04L 29/06* (2006.01)

(52) U.S. Cl.
CPC ............ *H04L 67/22* (2013.01); *G06F 3/0481* (2013.01); *G06Q 10/10* (2013.01); *G06Q 10/101* (2013.01); *G06Q 50/01* (2013.01); *H04L 65/403* (2013.01)

(58) Field of Classification Search
CPC ..... G06F 3/0481; G06Q 10/10; G06Q 10/101
See application file for complete search history.

(56) References Cited

U.S. PATENT DOCUMENTS

| | | | | |
|---|---|---|---|---|
| 7,117,518 B1 * | 10/2006 | Takahashi | ......... | G06F 17/30867 348/E5.105 |
| 8,219,453 B1 * | 7/2012 | Iida | ..................... | G06Q 30/0601 705/26.1 |
| 8,346,673 B2 * | 1/2013 | Wynn | ..................... | G06Q 30/06 705/307 |
| 8,527,909 B1 * | 9/2013 | Mullany | ............... | G06F 3/0484 345/173 |
| 8,560,398 B1 * | 10/2013 | Gregov | .................. | G06Q 30/06 705/26.2 |

(Continued)

OTHER PUBLICATIONS

Graphing With Excel—Bar Graphs and Histograms—2005.
Vudu 20.0—2010.

*Primary Examiner* — David Choi
(74) *Attorney, Agent, or Firm* — Thomas | Horstemeyer, LLP

(57) ABSTRACT

Disclosed are various embodiments for tracking, in at least one computing device, a presentation of a plurality of items for a user, each item being associated with at least one respective category of a plurality of categories, and determining a user histogram that is customized for a user. A visual symbol may be generated based at least upon the user histogram for each category, each visual symbol comprising a visual characteristic for associating the visual symbol to the category and a graphical dimension of the visual symbol, wherein the graphical dimension correlates with the respective degree of interest associated with the category. Each visual symbol may be appended to one another to form a graphic identifier and a user interface encoded for rendering, where the user interface comprises the graphic identifier.

20 Claims, 8 Drawing Sheets

(56) References Cited

U.S. PATENT DOCUMENTS

| | | | | |
|---|---|---|---|---|
| 2004/0177317 A1* | 9/2004 | Bradstreet | G06F 17/30017 | 715/202 |
| 2006/0015352 A1* | 1/2006 | Wynn | G06Q 30/06 | 705/307 |
| 2008/0117153 A1* | 5/2008 | Fujine | G09G 3/3406 | 345/89 |
| 2010/0023862 A1* | 1/2010 | Tai | G06F 17/30247 | 715/721 |
| 2010/0071005 A1* | 3/2010 | Kusunoki | G06F 17/30781 | 725/46 |
| 2010/0114979 A1* | 5/2010 | Petersen | G06F 17/30053 | 707/803 |
| 2010/0161619 A1* | 6/2010 | Lamere | G06F 17/3089 | 707/749 |
| 2010/0169778 A1* | 7/2010 | Mundy | G06F 17/30905 | 715/716 |
| 2010/0226563 A1* | 9/2010 | Takayama | G06K 9/6253 | 382/154 |
| 2010/0299603 A1* | 11/2010 | Farkas | G06F 17/30038 | 715/733 |
| 2012/0192075 A1* | 7/2012 | Ebtekar | H04L 12/6418 | 715/738 |
| 2012/0290977 A1* | 11/2012 | Devecka | H04W 4/206 | 715/810 |
| 2013/0013380 A1* | 1/2013 | Brower | G06Q 30/02 | 705/12 |
| 2013/0054433 A1* | 2/2013 | Giard | H04L 67/22 | 705/34 |
| 2013/0167168 A1* | 6/2013 | Ellis | H04N 5/44543 | 725/12 |
| 2013/0173533 A1* | 7/2013 | Nichols | G06F 17/30035 | 707/609 |
| 2015/0007045 A1* | 1/2015 | Salyers | G06Q 10/10 | 715/745 |

* cited by examiner

CUSTOMIZED GRAPHIC IDENTIFIERS

CROSS-REFERENCE TO RELATED APPLICATIONS

This application is a continuation of, and claims priority to, co-pending U.S. Patent Application entitled "CUSTOMIZED GRAPHIC IDENTIFIERS," filed Sep. 10, 2012, and assigned application Ser. No. 13/608,845, which is incorporated herein by reference in its entirety.

BACKGROUND

Network sites on the internet may foster a variety of online social communities. As users interact with each other over an online social community, a user may customize a personal user profile. A user profile may include a user name and/or a picture of the user. A user profile may establish an online presence of the user.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure is directed towards providing a customized graphic identifier that symbolizes and expresses a presence of a user in an online social community. A user may create a profile that represents the identity of the user in the context of establishing an online presence. In this respect, a user profile is unique to a particular user. Various embodiments of the present disclosure relate to generating a customized graphic identifier for a user that functions as a crest, symbol, badge, emblem, logo, or any other visual sign that is tailored to the uniqueness of an individual. For example, a user may identify a list of interests, tastes, or preferences for one or more activities. These preferences may be categorized into categories. Depending on the category and the degree of preference towards that category, a unique customized graphic identifier may be generated.

In various embodiments, a graphic identifier may be generated for a user in the context of genres for multimedia items such as, for example, movies and/or television programs. In this example, depending on the degree a particular user enjoys a genre of audio/video entertainment, a graphic identifier is generated for the user. Thus, each user may have a unique graphic identifier that visually expresses his or her tastes.

In various embodiments of the present disclosure, a user has the option share his or her graphic identifier with other users over one or more social media platforms. Furthermore, various comparisons are made between different users with regard to their respective graphic identifiers.

Figure 1:
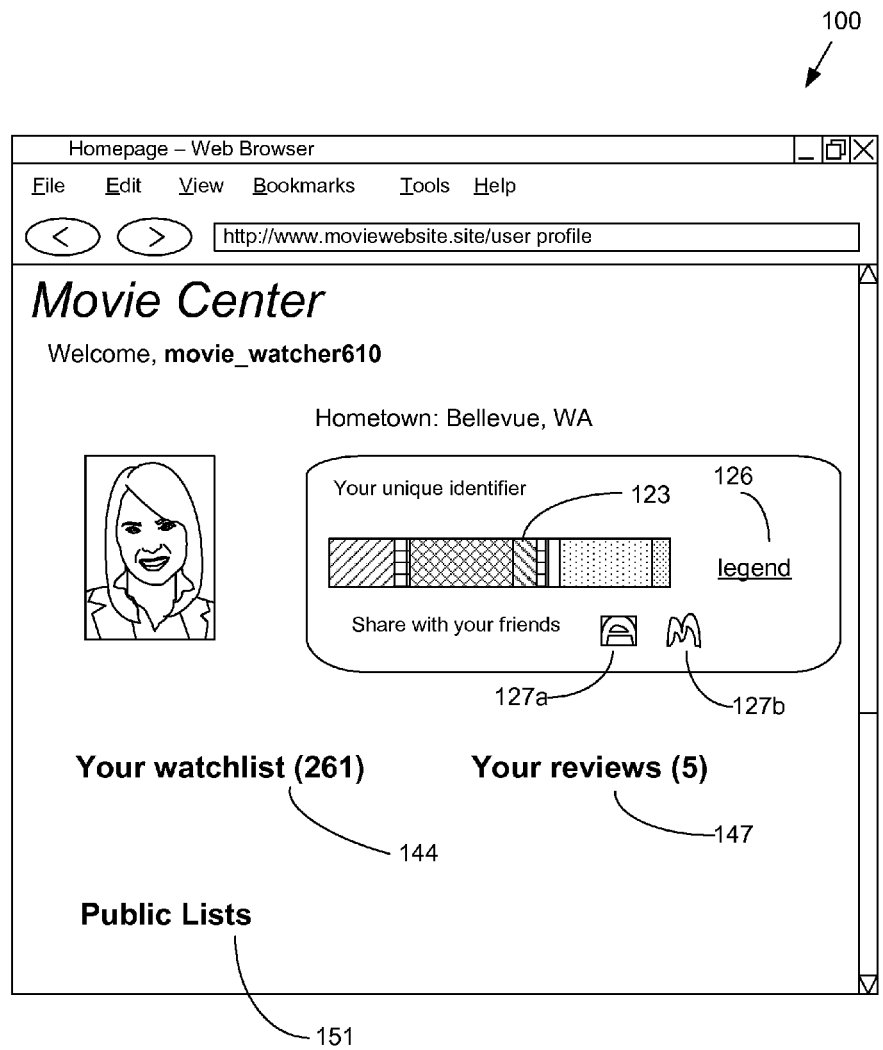
FIG. 1 is a drawing of an example of a network page according to various embodiments of the present disclosure.

In the network page 100 of FIG. 1, a profile home page is depicted. As seen in the example of FIG. 1, the network page 100 provides a portal to a network site platform directed to facilitating an online community of individuals who watch movies and/or television shows. The network page 100 may provide a welcome screen that identifies the user by a textual name, a profile picture, and/or any other personal data. The network page 100 provides a graphic identifier 123 according to various embodiments. The graphic identifier 123 is a customized identifier for the user that represents the user's presence over the network site platform. For example, the graphic identifier 123 is a visual representation determined by histograms and/or other statistics that model a user's preferences towards categories or genres of audio/video entertainment. The network page 100 provides a link to a legend 126 that may assist a user in interpreting the graphic identifier 123.

The network page 100 may provide one or more links that navigate to sections of the network site. For example the network page specifies a watchlist 144, user reviews 147, public lists 151, or any other link. The watchlist 144 may be, for example, a list of media items that has been presented to a user. User reviews 147 may capture user reviews of media items. Public lists 151 may be lists of media items created by entities other than the user. The graphic identifier 123 may be generated based on the data indicated by at least the watchlist 144 and/or the user reviews 147.

Furthermore, the network page 100 may provide one or more social media network site links 127a, b that allow a user to share his or her graphic identifier 123 over a third party social networking platform. This may, in turn direct traffic generated by third party social networking platforms to the network site platform responsible for generating the network page 100. In the following discussion, a general description of the system and its components is provided, followed by a discussion of the operation of the same.

Figure 2:
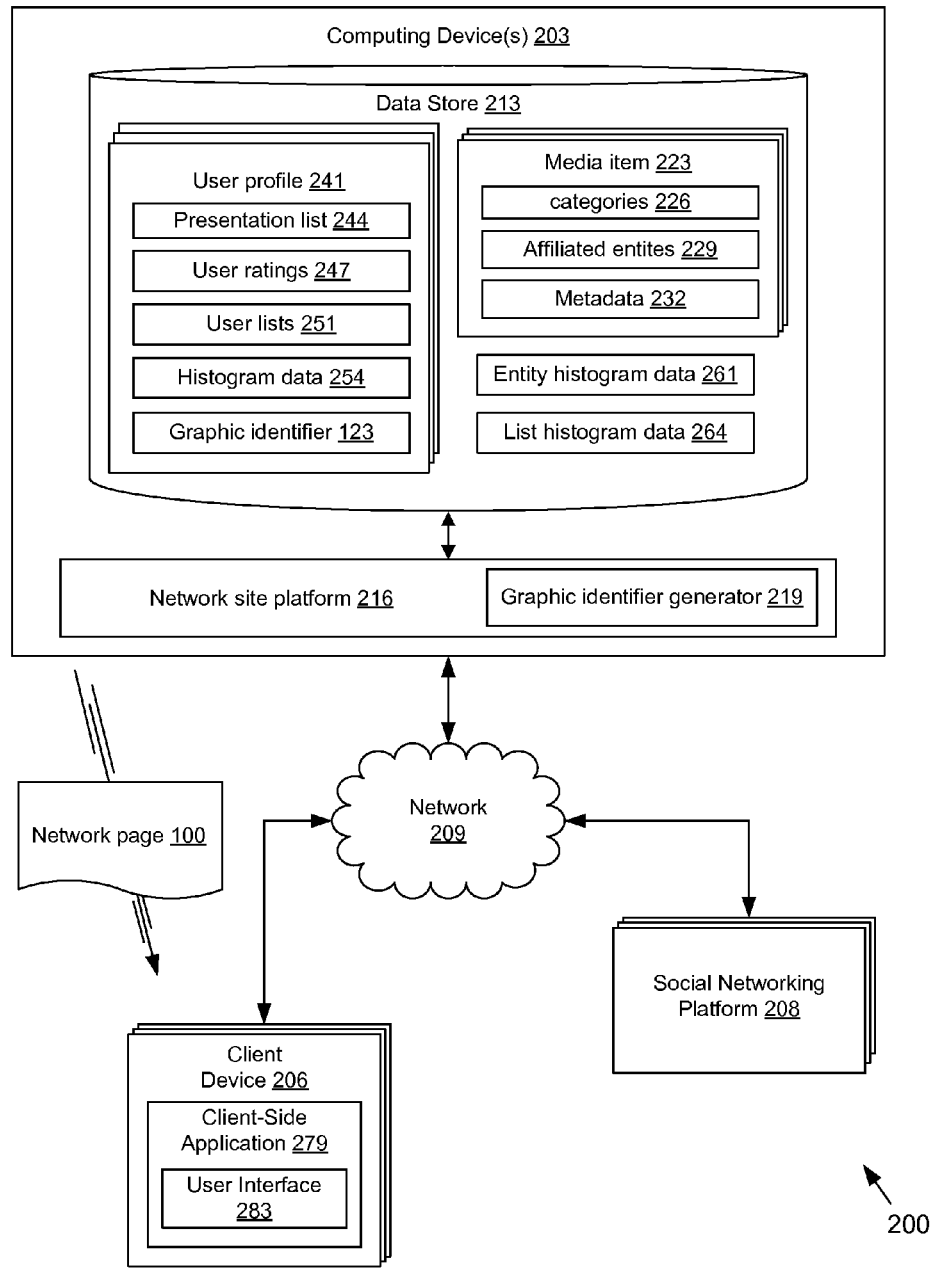
FIG. 2 is a drawing of a networked environment according to various embodiments of the present disclosure.

With reference to FIG. 2, shown is a networked environment 200 according to various embodiments. The networked environment 200 may include one or more computing devices 203, one or more client devices 206, one or more social networking platforms 208, and possibly other devices in data communication through a network 209. The network 209 may include, for example, the Internet, intranets, extranets, wide area networks (WANs), local area networks (LANs), wired networks, wireless networks, any other suitable networks, or any combination thereof.

The computing device 203 may comprise, for example, a server computer or any other system providing computing capability. Alternatively, a plurality of computing devices 203 may be employed that are arranged, for example, in one or more server banks, computer banks, or other arrangements. For example, a plurality of computing devices 203 together may comprise a cloud computing resource, a grid computing resource, and/or any other distributed computing arrangement. Such computing devices 203 may be located in a single installation or may be distributed among many different geographical locations. For purposes of convenience, the computing device 203 is referred to herein in the singular. Even though the computing device is referred to in the singular, it is understood that a plurality of computing devices 203 may be employed in the various arrangements as described above.

Various applications and/or other functionality may be executed in the computing device 203 according to various embodiments. Also, various data may be stored in a data store 213 that is accessible to the computing device 203. The data store 213 may be representative of a plurality of data stores. The data stored in the data store 213, for example, may be associated with the operation of the various applications and/or functional entities to be described later.

For instance, the data store 213 may include data representing one or more media items 223, one or more user profiles 241, entity histogram data 261, list histogram data, or any other data used to facilitate the operation of various applications and/or functional entities executed in connection with the computing device 203.

Media items 223 may be, for example, movies, television programs, e-books, paper books, magazines, journals, newspapers, blogs, websites, audiobooks, documentaries, news reports, songs, any other audio and/or video compilation, or any combination thereof. Thus, each media item 223 represents an individual piece of content that may be tracked. The content itself may or may not be stored in the data store 213. Each media item 223 may comprise one or more categories 226, one or more affiliated entities 229, or any other metadata 232. A category 226 may be, for example, a genre used to classify a particular media item. Other non-limiting examples of categories 226 are labels of a media item 223, the tone or mood of a media item 223, a type of influence of the media item 223, or any other classification of a media item 223. Furthermore, categories 226 may relate to properties of a media item 223 such as, for example, the duration, an origin, a nationality, a time period, a time of creation, or any other property of the media item 223.

Affiliated entities 229 may be, for example, authors, producers, actors, actresses, directors, writers, singers, musicians, or any other entity affiliated with the production or authorship of a corresponding media item 223. An affiliated entity may be affiliated with one or more media items 223 and a particular media item 223 may be associated with one or more affiliated entities. In addition, each media item 223 comprises additional metadata 232 used to characterize or otherwise classify a particular media item 223.

Each user profile 241 may comprise a presentation list 244, user ratings 247, user lists 251, histogram data 245, a graphic identifier 123, or any other user profile data. A presentation list 244 may be, for example, a watchlist 144 (FIG. 1) of movies. For example, the presentation list 244 may be a list of media items 223 a user has manually indicated as watched/read and/or a list representing an automated tracking of media items 223 that have been presented to a user.

User ratings 247 may comprise one or more user reviews 147 (FIG. 1) of movies, television programs, or any other media item 223. User ratings 247 may comprise any other user generated content that expresses the positive or negative preferences or feedback of a user regarding a media item 233. User lists 251 may be user generated lists of media items 223. Users may create lists of media items 223 to share with other users to facilitate discussions or for promoting a user's presence over a network site platform. Thus, a user list 251 may be made public and combined with other user lists 251 to generate one or more public lists 151 (FIG. 1).

The user profile 241 may also comprise histogram data 254 that provides a statistical model or histogram of the preferences, opinions, and/or tastes of a particular user. For example, histogram data 254 may quantify a user's interest in a variety of media item categories 226. This may, for example, reflect a user's interest for particular genres, particular time periods, particular durations, or any other interest in a category of media items 223. The graphic identifier 123 may be a unique visual/graphical representation of a user's preferences.

Entity histogram data 261 may relate to statistical data related to each affiliated entity 229. For example, the entity histogram data 261 may indicate the genres a particular actor has acted in and to what extent the particular actor acts in a particular genre. List histogram data 264 provides statistical data related to user lists 251 or public list 151. For example, a user list 251 may be statistically modeled to indicate the representation of one or more categories 226 in the user list 251.

The components executed on the computing device 203 include, for example, a network site platform 216 and possibly other applications, services, processes, systems, engines, or functionality not discussed in detail herein. The network site platform 216 may facilitate an online social community of users by providing communication and data services to each user. For example, a network site platform 216 may allow a user to track his or her hobbies or personal activities. In this respect, a user may identify his or her interests using a user profile 241. The network site platform 216 may provide an online forum for facilitating a posting of messages publically or privately to other users. In various embodiments, the network site platform 216 manages a user's interest with respect to various media items 223. For example, the network site platform 216 may track the movies or television shows that a particular user enjoys or dislikes.

The network site platform 216 may generate a network site to provide the services of the network site platform to users. The network site may encode for display one or more network pages 100 or network content embodied in some other form that facilitate access to the network site. The network site may include a network page server to serve data such as the network pages 100 to clients, such as the client devices 206, over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers. The network site platform 216 may also execute a graphic identifier generator 219 for generating graphic identifiers 123 for users, affiliated entities 229, user lists 251, etc.

The client device 206 is representative of a plurality of client devices that may be coupled to the network 209. The client device 206 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other device with like capability.

The client device 206 may be configured to execute various applications, such as a client-side application 279 and other applications. The client-side application 279 may be executed in the client device 206 for example, to access and render network pages 100, such as web pages, or other network content served up by the computing device 203 and/or other servers. To this end, the client-side application 279 in various embodiments may be embodied as a web browser. The client-side application 279 may also provide a user interface 283 to facilitate interaction with and control of the client-side application 279 and the client device 206. The client device 206 may also be configured to execute applications beyond the client-side application 279, such as email applications, instant message applications, and/or other applications.

The social networking platform 208 may communicate with one or more client devices 206 and computing device 203 over the network 209. The social networking platform 208 may be a third party platform that facilitates online interaction between users. The social networking platform 208 may, for example, connect users, such as family, friends, and other users who share interests. In some embodiments, the social networking platform 208 may be embodied in the form of, for example, a social networking site and have social networking network pages, such as web pages. For the social networking platform 208, each user may be associated with a profile, one or more social networking contacts, and potentially other information. The profile may include content provided by the user and/or generated by the social networking platform 208. As non-limiting examples, such content may be a short biography, one or more pictures, user demographics, and/or other information.

Next, a general description of the operation of the various components of the networked environment 200 is provided. To begin, it is assumed that at least the data for the user profiles 241 and media items 223 have been populated in the data store 213 and that the network site platform 216 has been executed and is running in the computing device 203.

In the course of its interactions with the network site platform 216, a user creates, manages and updates a user profile 241. The user may establish a presentation list 244 by manually searching or identifying various media items 223 to maintain a presentation list 244. If a particular media item 223 has been presented to the user, the presentation list 244 may be updated to reflect a recent presentation of the media item 223. A user may choose to provide user ratings 247 for various activities, such as, for example providing a review on a media item 223. When a user comments or reviews a media item 223, the user ratings 247 are updated to reflect the opinion and preferences of the user. Thus, as the user interacts with the network site platform, the amount of data relating to the personal tastes, experiences, preferences, and opinions of the user increases.

Histogram data 254 may be generated to mathematically model these personal characteristics of the user. In various embodiments, the histogram data 254 indicates the categories 226 of the media items 223 that a user may find appealing. To generate the histogram data 254, categories 226 associated with media items 223 associated with the presentation list 244 and the user ratings 247 may be used. Thus, the histogram data 254 of a user may be dynamically updated when a user updates the presentation list 244 and/or when a user provides additional user ratings 247.

Similarly, as affiliated entities 229 are associated with additional media items 223, the entity histogram data 261 for each entity is updated. For example, an actress who is typically associated with a category 226 of romantic comedies may have corresponding entity histogram data 261 that quantifies the degree the actress is associated with romantic comedies. This quantification may be based on the number of romantic comedy media items 233 affiliated with the actress A user may generate one or more user lists 251 such as for example, a list of top 20 favorite TV series. This user list 251 may be published as a public list 151 and shared with other users to facilitate discussion or for promoting the user's online presence. Each user list 251 may reference a subset of media items 223 and in turn, each user list 251 may be associated with one or more categories 226. Accordingly, for each user list 251, list histogram data 264 may be generated. The list histogram data 264 expresses the representation of categories 226 associated with a particular user list 251.

Based on histogram data 254, entity histogram data 261, or list histogram data 264, a corresponding graphic identifier 123 may be generated by the graphic identifier generator 219. In various embodiments, for a user, the graphic identifier generator 219 selects a unique visual symbol for each category expressed in the histogram data 254. Each symbol may be characterized by a graphical dimension. The graphic identifier generator 219 varies the graphical dimension according to the histogram data 254, entity histogram data 261, or list histogram data 264. The graphic identifier generator 219 arranges each visual symbol in a predetermined pattern to construct a customized graphic identifier 123 for the user. The graphic identifier generator 219 may generate graphic identifiers 123 for users, affiliated entities 229, or for user lists 251. These graphic identifiers 123 may be embedded in a network page 100 that is sent to the user for rendering at a client device 206. Furthermore, graphic identifiers 123 may be posted to network pages generated by social networking platforms 208. In this respect, a user may share the customized graphic identifier 123 with users who interact over the network site platform 216 as well as users who interact over third party platforms such as, for example, a social networking platform 208.

Figure 3:
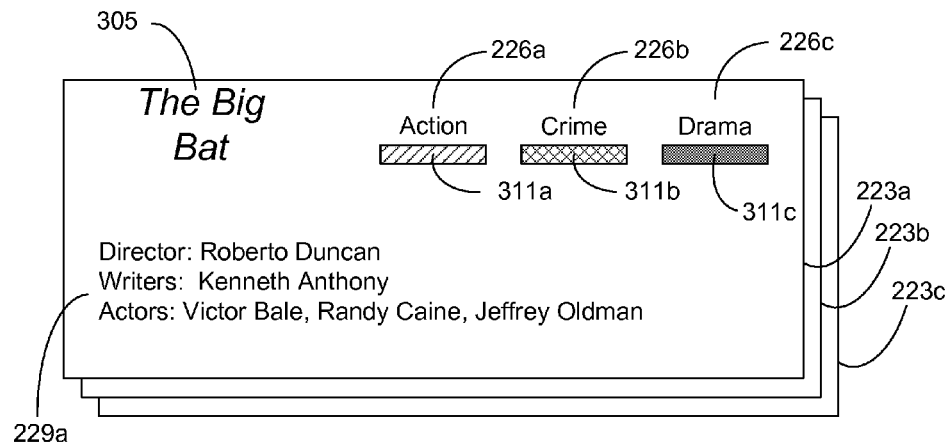
FIG. 3 is a drawing of an example of data stored in the networked environment of FIG. 2 according to various embodiments of the present disclosure.

Turning now to FIG. 3, shown is an example of data stored in the networked environment 200 of FIG. 2 according to various embodiments of the present disclosure. FIG. 3 provides a non-limiting example of a subset of media items 223a-c stored in a data store 213 (FIG. 2) in the networked environment 200. Specifically, FIG. 3 depicts storing a media item 223a that is a movie.

The media item 223a comprises a title 305 that may be stored as metadata 232 (FIG. 1). In addition the media item 223a comprises affiliated entities 229a. The media item 223a is also associated with a set of categories 226a-c. For example, the media item 223a titled "The Big Bat" is associated with the categories 226a-c of "action," "crime," and "drama." Each category 226a-c may correspond to a visual characteristic 311a-c. For example, the "action" category 226a may be associated with a first visual characteristic 311a, the "crime" category 226a may be associated with a second visual characteristic 311b, and the "drama" category 226b may be associated with a third visual characteristic 311c. A visual characteristic 311a-c may be, for example, a color, a visual pattern, a graphic texture, etc. Thus as seen in the non-limiting example of FIG. 3, a particular media item 223a may be associated with multiple categories 226a-c. Although the non-limiting example of FIG. 3 depicts categories 226a-c being genres of movies, various embodiments of the present disclosure are directed to categorizing a media item 223 by other categories 226 such as, for example, the duration of the media item 223, an origin or location of where the media item 223 was filmed or otherwise produced, a nationality associated with the media item 223, a time period associated with a plot of the media item 223, a time of creation or filming of the media item 223, or any other property of the media item 223.

Furthermore, the media item 223a comprises multiple affiliated entities 229a. Each affiliated entity 229a may be associated with one or more media items 223 (FIG. 2). The director, who may be one among a group of affiliated entities 229a, may be associated with other media items 223, where each media item 223 is associated with a corresponding set of categories 226 (FIG. 2). Thus, a particular director may be associated with a subset of categories 226. In the non-limiting example of FIG. 3, the affiliated entities 229a are associated with at least the categories 226a-c of "action," "crime," and "drama."

In various embodiments, the media item 223a may be referenced in a presentation list 244 (FIG. 2) of a user or a user list 251 (FIG. 2) of a user. It may be subjected to rating by a user. A user who has taken the time to playback/read the media item 223 and/or who has rated the media item 223 may be associated with the media item 223a as well as the categories 226a-c of the media item 223.

Figure 4A:
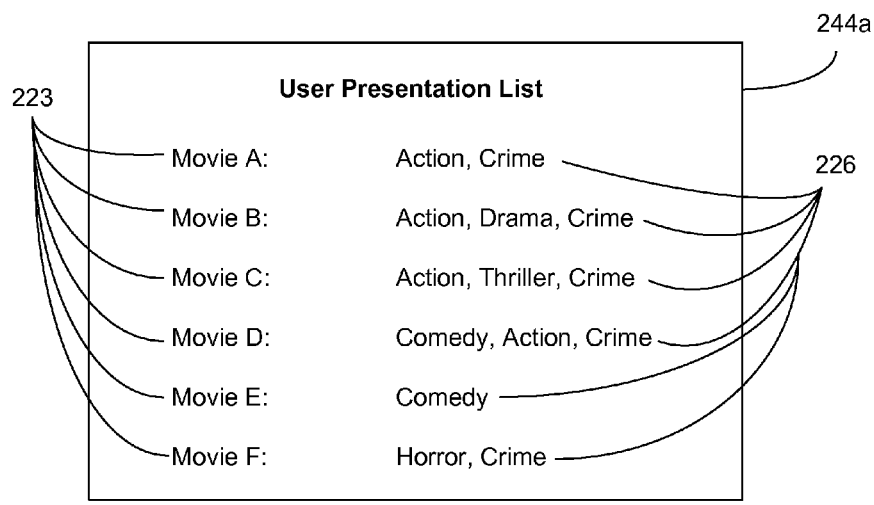
FIG. 4A is a drawing of an example of data stored in the networked environment of FIG. 2 according to various embodiments of the present disclosure.

Moving next to FIG. 4A, shown is an example of data stored in the networked environment 200 of FIG. 2 according to various embodiments of the present disclosure. FIG. 4A provides a non-limiting example of a presentation list 244a stored in a data store 213 (FIG. 2) in the networked environment 200. Specifically, FIG. 4A depicts an example of a presentation list 244a comprising six media items 223. Each media item 223 corresponds to one or more categories 226.

A media item 223 may be added to the presentation list 244a manually or automatically. For example, an automatic entry may be initiated when a user initiates playback of a media item 223 using a network media player that is associated with the presentation list 244a.

The presentation list 244a provides a way to associate a user with a one or more categories 226. For example, a majority of the media items 223 are associated with the categories 226 of "action" and "crime." Few of the categories 226 in the presentation list 244a relate to the category 226 of "drama." Thus, based on the user presentation list 244a, it may be inferred that the user associated with the presentation list 244a has watched few drama movies and has watched many action and crime movies. Based at least in part upon the presentation list 244a, histogram data 254 (FIG. 2) may be generated.

Figure 4B:
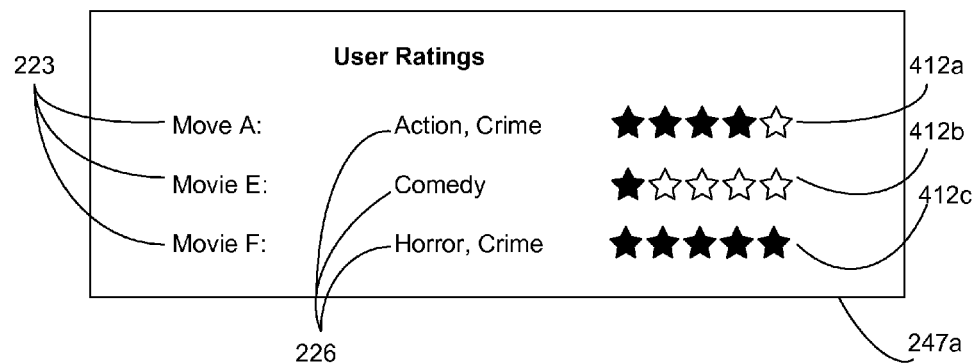
FIG. 4B is a drawing of an example of data stored in the networked environment of FIG. 2 according to various embodiments of the present disclosure.

Moving next to FIG. 4B, shown is an example of data stored in the networked environment 200 of FIG. 2 according to various embodiments of the present disclosure. FIG. 4B provides a non-limiting example of user ratings 247a stored in a data store 213 (FIG. 2) in the networked environment 200. Specifically, FIG. 4B depicts an example of user ratings 247a comprising three media items 223. Each media item 223 corresponds to one or more categories 226. Further, each media item 223 is associated with feedback data 412a-c.

Feedback data 412a-c may be specified by a user and directed to a particular media item 223. Feedback data 412a-c may quantitatively represent a degree of user interest for a particular media item 223. For example, first feedback data 412a indicates that a particular user likes the media item 223 of Movie A. This is quantified as a score of four out of five. Second feedback data 412b indicates that the particular user dislikes the media item 223 of Movie B. This is quantified as a score of one out of five. Third feedback data 412c indicates that the particular user greatly likes the media item 223 of Movie C. This is quantified as a score of five out of five.

The media items 223 listed in the user ratings 247a may comprise a portion of the media items 223 in the presentation list 244 (FIG. 2). For example, a user may provide user ratings 247a for some of the movies the movies that the user has watched. Based at least in part upon the user ratings 247a, histogram data 254 (FIG. 2) may be generated.

Figure 5:
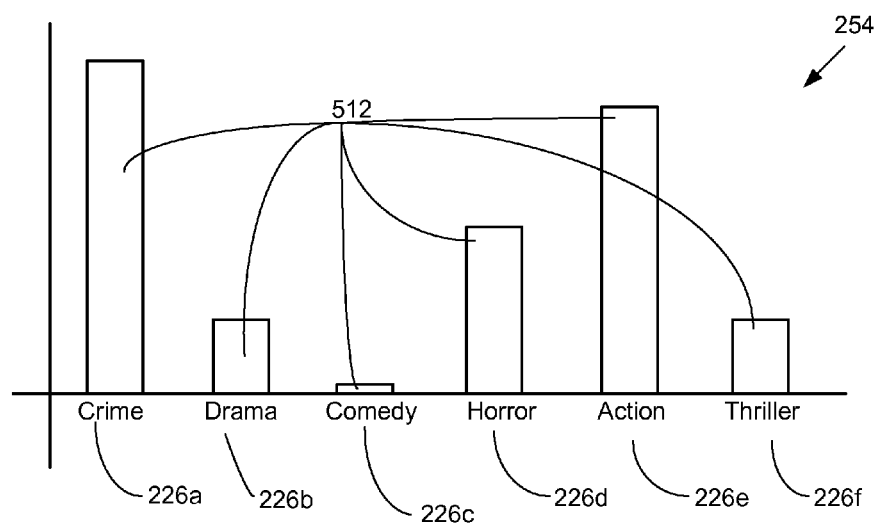
FIG. 5 is a drawing of an example of data stored in the networked environment of FIG. 2 according to various embodiments of the present disclosure.

Referring next to FIG. 5, shown is an example of data stored in the networked environment 200 of FIG. 2 according to various embodiments of the present disclosure. FIG. 5 provides a non-limiting example of histogram data 254 stored in a data store 213 (FIG. 2) in the networked environment 200. The histogram data 254 may be associated with a particular user. Alternatively, FIG. 5 provides a non-limiting example of entity histogram data 261 (FIG. 2) stored in the data store 213, where the entity histogram data 261 is associated with a particular affiliated entity 229. As another alternative, FIG. 5 provides a non-limiting example of list histogram data 264 (FIG. 2) stored in the data store 133, where the list histogram data 264 is associated with a particular user list 251 (FIG. 2).

In the case where FIG. 5 depicts histogram data 254 of a user, the histogram data 254 may be organized by mapping a category 226a-f of media items 223 (FIG. 2) to a degree of user interest 512. In various embodiments, the degree of user interest 512 is a quantitative value generated based on the presentation list 244a (FIG. 4A), the user ratings 247a (FIG. 4B), a user list 251 (FIG. 2), or any combination thereof. Thus, while a user may specify media items 223 in one or more lists, histogram data 254 is defined in terms of categories 226a-f associated with the media items 223.

In various embodiments, to determine a degree of interest 512, a number of instances that a media item 223 of particular category 226a-226f appears in a presentation list 244a may be used. Using the non-limiting example of FIG. 4A, of the six movies watched by a user, the "crime" category 226a appears the most and it significantly outweighs the "comedy" category 226c. Thus, the degree of interest for "crime" 226a is significantly higher that the degree of interest for "comedy" 226c. To this end, a quantitative degree of interest 512 may be calculated by analyzing the relative interest of a category 226a-f in a presentation list 244a.

In various embodiments, the degree of interest 512 may be calculated by analyzing user ratings 247a. Using the non-limiting example of FIG. 4B, of the three movies rated by a user, movies associated with the categories of "crime" 226a, "action" 226e, and "horror" 226d are rated much higher than the movie associated with the category of "comedy" 226c. Thus, the degree of interest for "crime" 226a, "action" 226e, and "horror" 226d are significantly higher that the degree of interest for "comedy" 226c. In various embodiments, the degree of interest 512 is weighted according to the feedback data 412a-c (FIG. 4B) associated with each category 226a-f. For example, the feedback data 412a-c may be expressed as a quantitative score. The quantitative score may correlate with a weight assigned to each category 226a-f when calculating a degree of interest 512.

Information expressed in the presentation list 244a may be combined with information expressed in the user ratings 247a to generate the histogram data 254. For example, each instance a category 226a-f is represented in a presentation list 244a may be counted and assigned a neutral weight. Then, the count for each category may be modified according to the user ratings 247a. For example, categories 226a, d, e with high ratings may receive a greater weight and categories 226c with lower ratings may receive a lower weight.

In the case where FIG. 5 depicts entity histogram data 261 for a particular affiliated entity 229, the entity histogram data 261 may express a degree of involvement 512 between the affiliated entity 229 and a corresponding category 226a-f. For example, the entity histogram data 261 may indicate the types of television shows in which a particular actor has acted.

In the case where FIG. 5 depicts list histogram data 264 for a particular user list 251, the list histogram data 264 may express a degree of representation 512 between a user list 251 and a corresponding category 226a-f. For example, the list histogram data 264 may indicate the categories 226a-f of media items 233 that are found in a list of a user's top 50 movies of the 1980s.

Figure 6A:
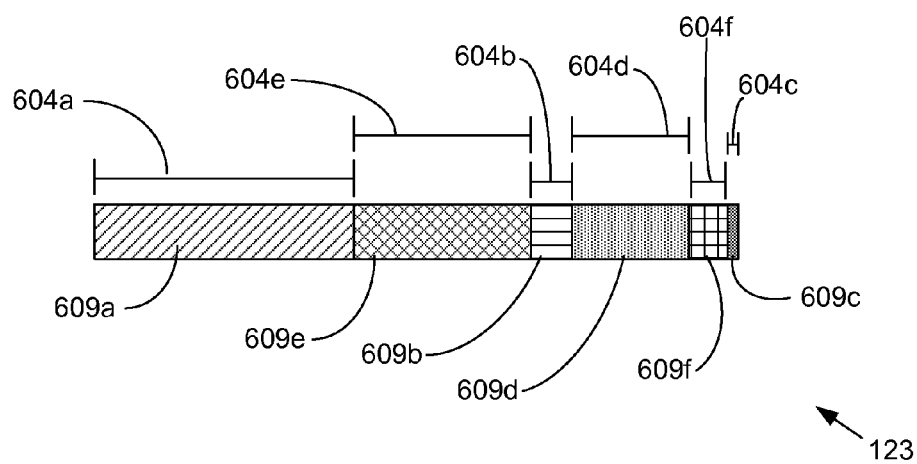
FIG. 6A is a drawing of an example of a graphic identifier implemented in a network page in the networked environment of FIG. 2 according to various embodiments of the present disclosure.

Turning to FIG. 6A, shown is an example of a graphic identifier 123 implemented in a network page 100 (FIG. 1) in the networked environment 200 of FIG. 2 according to various embodiments of the present disclosure. FIG. 6A provides a non-limiting example of a graphic identifier 123 generated based on the histogram data 254 of the example of FIG. 5. Alternatively FIG. 6A provides a non-limiting example of a graphic identifier 123 generated based on entity histogram data 261 (FIG. 2) for a particular affiliated entity 229 (FIG. 2) or based on list histogram data 264 (FIG. 2) for a particular user list 251 (FIG. 2).

The graphic identifier 123 comprises a set of visual symbols 609a-f. Visual symbols 609a-f may be defined as a geographic shape such as, for example, a triangle, quadrilateral, rectangle, square, circle, semi-circle, or any other geometric shape. Each visual symbol 609a-f may be characterized by a visual characteristic such as, for example, the visual characteristics 311a-c of FIG. 3. Non-limiting examples of visual characteristics include an outline color, a fill color, a visual pattern, a graphic texture, etc.

The visual characteristic may uniquely associate a particular visual symbol 609a-f with a corresponding category 226 (FIG. 2). For example, a first visual symbol 609a may comprise a visual characteristic associated with the category of "crime" 226a (FIG. 5). A second visual symbol 609b may comprise a visual characteristic associated with the category of "drama" 226b (FIG. 5), etc. To this end, each visual characteristic of each visual symbol 609a-f is unique with respect to other visual characteristic. Moreover, the visual characteristic of a visual symbol 609a-f determines the type of visual symbol 609a-f. A visual symbol 609a-f associated with a visual characteristic for the category of "thriller" 226f may be deemed a "thriller" visual symbol 609f.

Furthermore, each visual symbol 609 a-f may be characterized by a graphical dimension 604a-f. The graphical dimension 604a-f may be, for example, a size used to measure a geometric property of the corresponding visual symbol 609a-f. Non limiting examples of graphical dimensions 604a-f include a diameter, a width, a length, a radius, a height, arc length, an area, a depth, etc. In various embodiments, the graphical dimension 604a-f correlates with a corresponding degree of interest 512, degree of involvement 512, or degree of representation 512. For example, in the case where the graphic identifier 123 is for a user, the greater in area the visual symbol is 609a-f, the greater the degree in interest. Thus, the "crime" visual symbol 609 has the largest graphical dimension 604a in the graphic identifier 123 and accordingly, this implies that the user is highly interested in media items 223 relating to crime.

In various embodiments, a graphic identifier generator 219 (FIG. 2) generates the graphic identifier 123. For example, the graphic identifier generator 219 generates visual symbols 609a-f according to various embodiments of the present disclosure and arranges the visual symbols 609a-f in an adjacent manner to construct the graphic identifier 123. As seen in the non-limiting example of FIG. 6A, visual symbols 609a-f may be rectangles arranged linearly to form a bar or larger rectangle. To this end, the visual symbols 609a-f are appended to form an aesthetically pleasing graphic identifier 123 that is customized according to a user, an affiliated entity 229 (FIG. 2) or a user list 251 (FIG. 2).

In various embodiments, the categories 226 represented in the graphic identifier 123 may be grouped together to form super-categories or the categories may be broken down or otherwise separated into sub-categories. By grouping or separating the categories 226, the level of granularity of the graphic identifier 123 may be adjusted. A super-category may be a logical combination of categories 226. For example, a combination of the "horror" category 226d and the "thriller" category 226f may lead to a "horror/thriller" category 226. By using super-categories, a graphic identifier 123 may include one visual symbol 609a-f that represents the super-category of the "horror/thriller" category 226. Through the use of super-categories, the number of visual symbols 609a-f included in a graphic identifier 123 is lowered. This leads to a graphic identifier with lower granularity or detail.

In order to combine visual symbols 609a-f to represent a super-category, the graphic identifier generator 219 may sum together each graphical dimension 604a-f of each category 226a-f of the super-category to determine a graphic dimension of the super-category. For example, the visual symbol 609a-f of the horror/thriller" category 226 may be characterized by a graphical dimension of the sum of the graphical dimension 604d of the "horror" visual symbol 609d and the graphical dimension 604f of the "thriller" visual symbol 609f. Put another way, the graphic identifier generator 219 may modify the histogram data 254 used to generate the graphic identifier 123. The histogram data 254 may be modified by combining the histogram data 254 associated with the categories 226 of a like super-category.

A visual symbol 609a-f for a super-category may be associated with a visual characteristic that comprises a combination, mixture, or a blend of the respective visual characteristics of each of the categories 226 that make up the super category. For example, if the visual characteristic of the "horror" category 226d has a fill color of dark red and the visual characteristic of the "thriller" category 226f has a fill color of pink, then the visual characteristic of the visual symbol 609a-f for the super-category of "horror/thriller" may be a blend, combination, or mixture of the colors of dark red and pink.

Similarly, sub-categories may be used to increase the granularity of detail of the graphic identifier 123. By separating a category 226 into sub-categories, the number of visual symbols 609a-f included in the graphic identifier 123 increases, thereby increasing the level of detail of the graphic identifier 123. For example, the "action" category 226e may be separated into an "action" category 226f and an "adventure" category.

When the graphic identifier 123 is presented to a user in a network page 100, as seen in the non-limiting example of FIG. 1, a user may be presented with an option to increase or decrease the level of detail/granularity of the graphic identifier 123. In this respect, a graphic identifier generator 219 may receive an indication from the user to generate one or more super-categories or subcategories. The graphic identifier generator 219 may generate an updated visual symbol 609a-f for each super category or subcategory based at least upon the histogram data 254 of the user. In various embodiments, as the user adjusts the level of detail/granularity using, for example, a user interface magnification tool included in the network page 100, the graphic identifier 123 may be dynamically modified based on the updated visual symbols 609a-f.

The graphic identifier 123 functions as a crest, symbol, badge, emblem, logo, or any other visual sign that is tailored to the uniqueness of an individual. In this respect, the graphic identifier 123 may be presented as at least a portion of a user profile in a network page 100 (FIG. 1) for identifying the user.

Figure 6B:
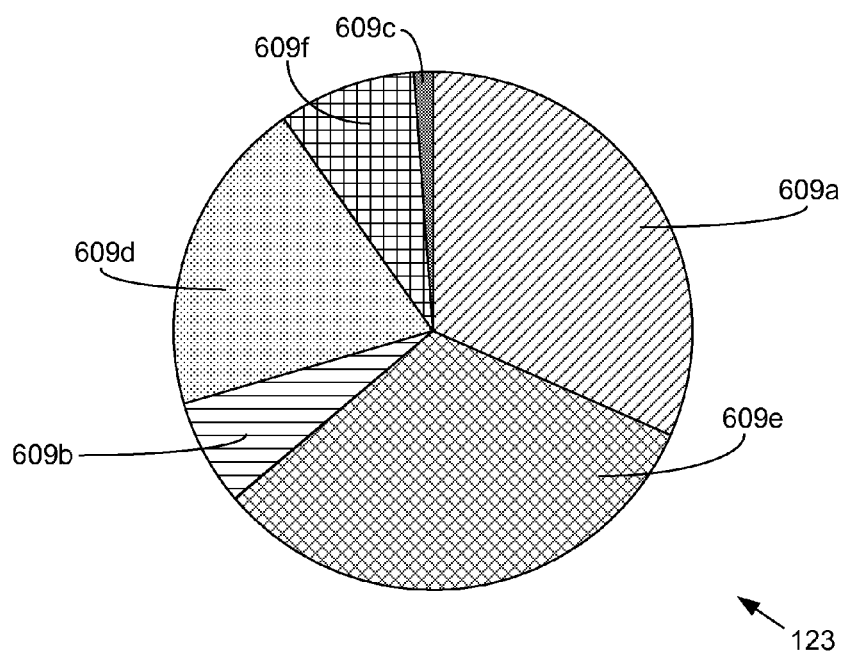
FIG. 6B is a drawing of an example of a graphic identifier implemented in a network page in the networked environment of FIG. 2 according to various embodiments of the present disclosure.

Turning to FIG. 6B, shown is an example of a graphic identifier 123 implemented in a network page 100 (FIG. 1) in the networked environment of FIG. 2 according to various embodiments of the present disclosure. FIG. 6B provides a non-limiting example of a graphic identifier 123 generated based on the histogram data 254 of the example of FIG. 5. Alternatively FIG. 6B provides a non-limiting example of a graphic identifier 123 generated based on entity histogram data 261 (FIG. 2) for a particular affiliated entity 229 (FIG. 2) or based on list histogram data 264 (FIG. 2) for a particular user list 251 (FIG. 2).

FIG. 6B depicts a graphic identifier 123 that comprises a set of visual symbols 609a-f arranged in an alternative arrangement than the depiction of FIG. 6A. For example, the visual symbols 609a-f of FIG. 6B are depicted according to a geometric shape of a pie slice. To this end, each pie slice is characterized by a graphical dimension of at least an arc length, an angle, and an area. The graphic dimension may correlate with the degree of interest 512 (FIG. 5), the degree of involvement 512, or degree of representation 512 of statistical data such as, for example, a histogram.

Figure 7:
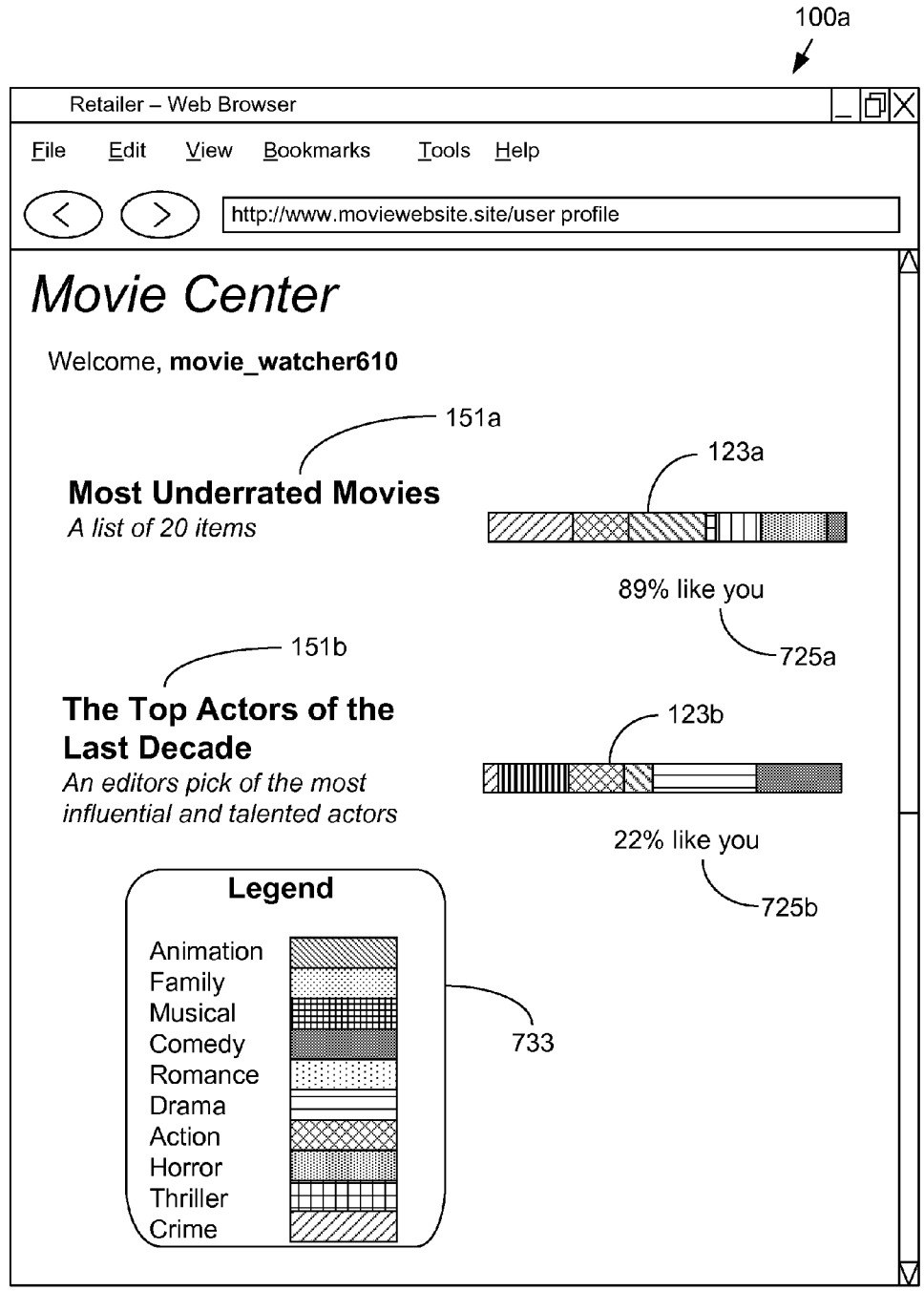
FIG. 7 is a drawing of an example of a network page in the networked environment of FIG. 2 according to various embodiments of the present disclosure.

Referring next to FIG. 7, shown is an example of a network page 100a in the networked environment 200 of FIG. 2 according to various embodiments of the present disclosure. FIG. 7 provides a non-limiting example, a network page generated by a network site platform 216 (FIG. 2) for rendition in one or more client devices 206 (FIG. 2).

The network page 100a comprises one or more public lists 151a, b. Public lists 151a, b may be user lists 251 (FIG. 2) generated by various users and made public over the network site platform 216 for display to other users. Each public list 151a-b may include a reference to a subset of media items 223 (FIG. 1) and a user generated description of the public list 151a, b.

Each user list 251 is associated with a corresponding graphic identifier 123a, b. In this respect, each user list may be associated with list histogram data 264 (FIG. 2). The list histogram data 264 is determined based on the subset of media items 223 associated with the public list 151a, b. A graphic identifier 123a, b, may be generated according to the list histogram data 264 for each public list. Thus, each public list 151a, b may be associated with a unique visual representation of the contents of the public list 151a, b.

Each public list 151a, b may have a corresponding similarity value 725a, b depending on a particular user. The similarity value 725a, b, is determined based on comparing the list histogram data 264 of a public list 151a, b to the histogram data 254 of the particular user. In this respect, the similarity value 725a, b quantitatively expresses a degree that two sets of histogram data match one another. A user may determine whether a particular public list 151a, b, is similar to his or her own preferences by using the similarity value 725a, b or by visually comparing the graphic identifier 123a, b of the public list 151a, b, to the user's own graphic identifier 123 (FIG. 1).

The network page 100a also comprises a legend 733 that associates categories 226 with corresponding visual characteristics. The legend 733 may assist a user in interpreting various graphic identifiers 123, 123a, 123b.

Although network page 100a may depicts comparing the preferences of a user to one or more lists, the network page 100a may also compare the preferences of a user to one or more affiliated entities 229 (FIG. 2). For example, similarity values may be provided to a user for comparing the preferences of a user to the kinds of media items with which a particular affiliated entity 229 is affiliated.

Furthermore, the preferences of one user may be compared to the preferences of another user. Histogram data 254 may be maintained for each user and accordingly, each user may be associated with a customized graphic identifier 123. As users access their own profiles as well as the profiles of other users, a comparison of the preferences of two users may be generated and presented to one or more users in a user interface. Thus, the non-limiting example of FIG. 7 also depicts a user interface that compares histogram data between two or more users.

Figure 8:
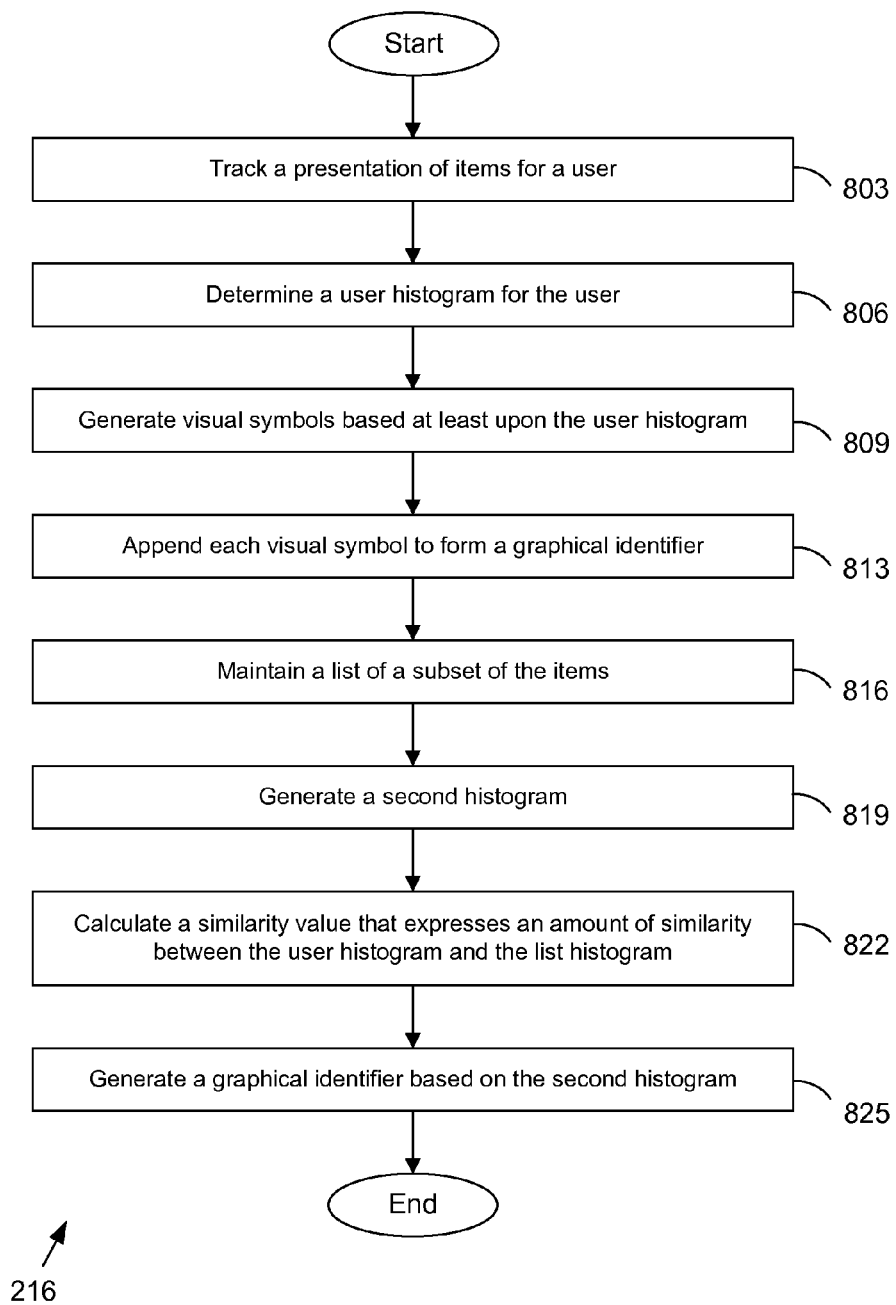
FIG. 8 is a drawing of a flowchart that provides one example of the operation of a portion of graphic identifier generator implemented in the networked environment of FIG. 2 according to various embodiments of the present disclosure.

Referring next to FIG. 8, shown is a flowchart that provides one example of the operation of a portion of the network site platform 216 according to various embodiments. It is understood that the flowchart of FIG. 8 provides merely an example of the many different types of functional arrangements that may be employed to implement the operation of the portion of the network site platform 216 as described herein. As an alternative, the flowchart of FIG. 8 may be viewed as depicting an example of steps of a method implemented in the computing device 203 (FIG. 2) according to one or more embodiments. The flowchart of FIG. 8 depicts an example of the network site platform 216 generating a graphic identifier 123 (FIG. 1) for a user, an affiliated entity 229 (FIG. 2), or a user list 251 (FIG. 2), which may be a public list 151 (FIG. 1).

Beginning with block 803, the network site platform 216 tracks a presentation of items for a user. Items may be media items 223 of FIG. 2. Items may also be virtual representations of activities such as, for example, hobbies, interests, products, or any other item with which a user may be involved. To this end, the network site platform 216 may track a performance or otherwise an engagement of an activity or hobby for a user.

The network site platform 216 may manage a presentation list 244 (FIG. 2) that references at least a subset of items that have been presented to a user, tracked for a user, or associated with a user. In various embodiments, the network site platform 216 also tracks user review data, such as, user ratings 247 of one or more items. In block 806, the network site platform 216 determines a histogram for the user. The network site platform 216 may generate histogram data 254 based at least upon the presentation list 244 and/or the user ratings 247. For example, the network site platform 216 calculates a histogram of the categories 226 (FIG. 2) of the media items 223 identified in the presentation list 244 and/or the user ratings 247. Categories 226, for example, may be a genre of an item. To this end the histogram tracks a respective degree of a user interest 512 (FIG. 5) for each of the categories 226. In various embodiments, the histogram data 254 weights the degree of interest 512 for each category 226 according to feedback data 412a-c (FIG. 4B) included in the user ratings 247.

In block 809, the network site platform 216 generates a graphic identifier 123 made up of a group of visual symbols 609a-f (FIG. 6A) based at least upon the histogram data. The network site platform 216 may employ a graphic identifier generator 219 (FIG. 1) to generate the visual symbols 609a-f. Each visual symbol 609a-f may comprise a visual characteristic 311a-c (FIG. 3) that associates the visual symbol 609a-f with a corresponding category 226 or corresponding genre. To this end, each visual characteristic 311a-c is a unique representation of a corresponding category 226 or corresponding genre. Furthermore, each visual symbol 609a-f may comprise a graphical dimension 604a-f that correlates with a respective degree of interest 512 for each category 226 or genre.

In block 813, the network site platform 216 appends each visual symbol 609a-f to one another to form a graphical identifier. In various embodiments, each visual symbol 609a-f is adjacently placed with respect to one another to form a unified graphic identifier 123.

In block 816, the network site platform 216 may maintain a list of a subset of items. In various embodiments, the subset of items may be, for example, relating to items associated with a particular affiliated entity 229. For example, this may be a list of books, movies, or television programs that were written by a particular writer. In other embodiments, the subset of items relates to items referenced by a user list 251 or a public list 151.

In block 819, the network site platform 216 generates a second histogram based at least upon the subset of items. If the subset of items pertains to a particular affiliated entity 229, then the second histogram may be characterized as entity histogram data 261. If the subset of items pertains to a user list 251 or public list 151, then the second histogram may be characterized as list histogram data 264. In block 822, the network site platform 216 may calculate a similarity value that expresses an amount of similarity between the user histogram and the second histogram. In block 825 the network site platform 216 generates a graphic identifier 123 based at least on the second histogram. For example, this graphic identifier 123 may be customized for a particular affiliated entity 229 or for a particular user list 251 or public list 151.

Figure 9:
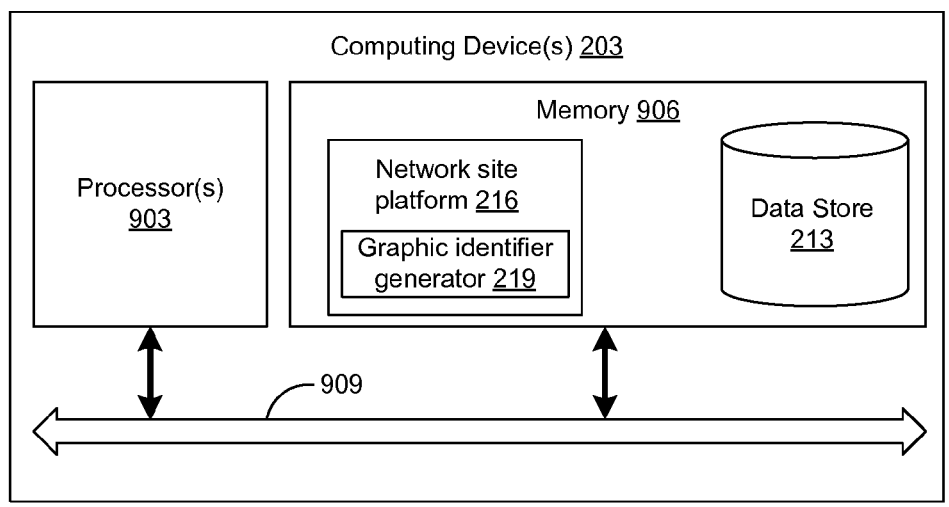
FIG. 9 is a schematic block diagram that provides one example illustration of a computing device employed in the networked environment of FIG. 2 according to various embodiments of the present disclosure.

With reference to FIG. 9, shown is a schematic block diagram of the computing device 203 according to an embodiment of the present disclosure. The computing device 203 includes at least one processor circuit, for example, having a processor 903 and a memory 906, both of which are coupled to a local interface 909. To this end, the computing device 203 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 is the network site platform 216, the graphic identifier generator 219, and potentially other applications. Also stored in the memory 906 may be the data store 213 and other data.

It is understood that there may be other applications that are stored in the memory 906 and are executable by the processors 903 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network 209 (FIG. 2) that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the network site platform 216, graphic identifier generator 219, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 8 shows the functionality and operation of an implementation of portions of the network site platform 216. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site platform 216, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying an application executable in at least one computing device, wherein, when executed, the application causes the at least one computing device to at least:
   determine a level of interest for individual ones of a plurality of categories associated with a plurality of items based at least in part on a user profile, the level of interest for the individual ones of the plurality of categories being unique to the user profile;
   generate an icon visually indicating the level of interest for the individual ones of the plurality of categories, the icon comprising a geometric shape comprising a plurality of sections of varying size, individual sections of the plurality of sections comprising a respective symbol of a plurality of symbols, individual ones of the plurality of symbols corresponding to the individual ones of the plurality of categories, and the level of interest for the individual ones of the plurality of categories by the user profile being represented by a corresponding relative size of the individual ones of the plurality of symbols, wherein the icon represents an identity of a user associated with the user profile, and the geometric shape being formed by appending individual sections of the plurality of sections to one another; and
   encode for rendering a user interface comprising the icon.

2. The non-transitory computer-readable medium of claim 1, wherein the user profile comprises at least one of: a user review of at least one of the plurality of items, a presentation list identifying the plurality of items that have been presented to a user associated with the user profile, or a user list identifying at least a portion of the plurality of items.

3. The non-transitory computer-readable medium of claim 1, wherein, when executed, the application further causes the at least one computing device to at least dynamically update the level of interest for at least one of the plurality of categories upon detection of a change in the user profile.

4. The non-transitory computer-readable medium of claim 3, wherein, when executed, the application further causes the at least one computing device to at least regenerate the icon in response to dynamically updating the level of interest for the at least one of the plurality of categories.

5. The non-transitory computer-readable medium of claim 1, wherein, when executed, the application further causes the at least one computing device to at least transmit the icon to a social network platform for rendering in another user interface generated by the social network platform.

6. The non-transitory computer-readable medium of claim 1, wherein the plurality of items comprise at least one of: a movie, a television program, an electronic book, a paper book, a magazine, a journal, a newspaper, a blog, a website, an audio book, a documentary, a news report, or a song.

7. The non-transitory computer-readable medium of claim 1, wherein generating the icon further comprises selecting a unique visual symbol for the individual ones of the plurality of categories.

8. The non-transitory computer-readable medium of claim 7, wherein the unique visual symbol comprises at least one of: a color, a visual pattern, or a graphic texture.

9. The non-transitory computer-readable medium of claim 1, wherein the user interface further comprises a legend for interpreting the icon.

10. A system, comprising:
at least one computing device; and
an application executable in the at least one computing device, wherein, when executed, the application causes the at least one computing device to at least:
determine a plurality of categories associated with a plurality of media items identified in a user profile, the user profile comprising at least one of: a user review of at least one of the plurality of media items, a presentation list identifying the plurality of media items that have been presented to a user associated with the user profile, or a user-created list identifying at least a portion of the plurality of media items;
determine a level of interest for individual ones of the plurality of categories based at least in part on the user profile, the level of interest for the individual ones of the plurality of categories being unique to the user profile; and
generate a graphical icon illustrating the level of interest for the individual ones of the plurality of categories associated with the user profile, the graphical icon comprising a geometric shape having a plurality of sections of varying sizes, individual ones of the plurality of sections corresponding to the individual ones of the plurality of categories, and a corresponding relative size of the individual ones of the plurality of sections being based at least in part on the level of interest of the individual ones of the plurality of categories, the graphical icon representing an identity of a user associated with the user profile, the geometric shape being formed by appending individual sections of the plurality of sections to one another.

11. The system of claim 10, wherein the graphical icon is specific to the user profile.

12. The system of claim 10, wherein the plurality of categories comprises at least one: of a duration, an origin, a nationality, a time period, or a time of creation.

13. The system of claim 10, wherein the plurality of categories comprise a plurality of genres associated with the plurality of media items.

14. The system of claim 10, wherein, when executed, the application further causes the at least one computing device to at least generate histogram data associated with at least one of: at least one preference associated with the user profile or at least one opinion associated with the user profile.

15. The system of claim 10, wherein individual ones of the plurality of sections comprise a unique visual symbol including at least one of: a color, a visual pattern, or a graphic texture.

16. The system of claim 10, wherein, when executed, the application further causes the at least one computing device to at least generate a user interface comprising the graphical icon, the user interface being associated with the user profile.

17. A method, comprising:
classifying, by at least one computing device, a plurality of items identified in a user profile into a plurality of categories;
evaluating, by the at least one computing device, the user profile to determine a degree of user interest associated with individual ones of the plurality of categories, the degree of user interest being unique to the user profile;
generating, by the at least one computing device, a user icon visually indicating the degree of user interest for the individual ones of the plurality of categories, the user icon comprising a geometric shape comprising a plurality of sections of varying size, individual sections of the plurality of sections comprising a respective symbol of a plurality of symbols corresponding to the plurality of categories, a corresponding relative size of the individual ones of the plurality of symbols indicating the degree of user interest for the individual ones of the plurality of categories, the user icon representing a presence of a user associated with the user profile, and the geometric shape being formed by appending the individual sections of the plurality of sections to one another;
encoding for rendering, by the at least one computing device, a user interface comprising the user icon; and
transmitting, by the at least one computing device, the user interface to at least one client device.

18. The method of claim 17, wherein the plurality of items are identified in the user profile via at least one of: a user review, a presentation list of items that have been presented to the user associated with the user profile, or a user-created list of items.

19. The method of claim 17, wherein individual ones of the plurality of symbols comprise a unique visual characteristic such that a first unique visual characteristic of a first symbol of the plurality of symbols is different from a second unique visual characteristic of a second symbol of the plurality of symbols.

20. The method of claim 17, further comprising transmitting, by the at least one computing device, the user icon to a social networking platform for rendering in another user interface generated by the social networking platform, the user icon being shared via the social networking platform to represent a user associated with the user profile in a social networking profile.

* * * * *